US008458565B2

(12) United States Patent
Hall et al.

(10) Patent No.: US 8,458,565 B2
(45) Date of Patent: Jun. 4, 2013

(54) FLASH-BASED EEPROM EMULATION USING ERROR CORRECTION CONTROL

(75) Inventors: John Robert Hall, Houston, TX (US); Robert M. Crosby, Sugar Land, TX (US); Ulrike Behringer, Munich (DE)

(73) Assignee: Texas Instruments Incorporated, Dallas, TX (US)

( * ) Notice: Subject to any disclaimer, the term of this patent is extended or adjusted under 35 U.S.C. 154(b) by 340 days.

(21) Appl. No.: 13/022,624

(22) Filed: Feb. 7, 2011

(65) Prior Publication Data
US 2012/0204078 A1 Aug. 9, 2012

(51) Int. Cl.
*G11C 29/00* (2006.01)
(52) U.S. Cl.
USPC ............ 714/763; 714/758; 711/103; 718/104
(58) Field of Classification Search
USPC .................... 714/763, 758; 718/104; 711/103
See application file for complete search history.

(56) References Cited

U.S. PATENT DOCUMENTS 5,974,440 A * 10/1999 Brooks et al. ................. 710/262
2010/0235831 A1* 9/2010 Dittmer ............................ 718/1

* cited by examiner

*Primary Examiner* — Guy Lamarre
(74) *Attorney, Agent, or Firm* — Lawrence J. Bassuk; W. James Brady; Frederick J. Telecky, Jr.

(57) ABSTRACT

A circuit for emulating bit-level erasable non-volatile memory includes an emulator that activates a first virtual sector of a bit-level programmable, block-level erasable non-volatile memory. The first virtual sector receives and stores write requests having an address and a record to be written to the received address. A linked list of records is used to store each subsequent record received in subsequent write requests having the received address. A separate thread in the linked list is maintained for each different received address. The last record subsequently received for each of the received addresses is copied to a linked list of a second virtual sector when a first operating parameter has been exceeded. The active virtual sector is deactivated and erased when the last record subsequently received for each of the received addresses in the linked list of the active virtual sector have been copied to the second virtual sector.

20 Claims, 5 Drawing Sheets

FLASH-BASED EEPROM EMULATION USING ERROR CORRECTION CONTROL

BACKGROUND

Many applications often store relatively small quantities of system-related data (e.g., calibration values and device configuration information) in a non-volatile memory, so that the system-related data can be used, modified or reused, even after cycling the power applied to the system. EEPROMs (Electrically Erasable Programmable Read-Only Memories) are often used for this purpose. The EEPROMs have the ability to erase and write individual bytes of memory many times over, while the programmed locations retain the data over a relatively long period of time even when the system is powered down. However, using EEPROMs presents difficulty in designing integrated systems because of the differing technologies used to implement the EEPROMs and other parts of the integrated systems.

SUMMARY

The problems noted above are solved in large part by emulating EEPROM using sectors of flash memory to compensate for the limitations of flash memory. The emulation functions are arranged to be used by an application program such that flash memory can be transparently accessed as a functional substitute for an EEPROM devices. As disclosed herein, a circuit for emulating bit-level erasable non-volatile memory includes an emulator that activates a first virtual sector of a bit-level programmable, block-level erasable non-volatile memory. The first virtual sector is used to store write requests each of which have an address and a record to be written to the received address. A linked list of records in the first virtual sector is used to store each subsequent record received in subsequent write requests having the received address. A separate thread in the linked list is maintained for each different received address. The last record subsequently received for each of the received addresses is copied to a linked list of a second virtual sector when a first operating parameter has been exceeded. The active virtual sector is deactivated and erased when the last record subsequently received for each of the received addresses in the linked list of the active virtual sector have been copied to the second virtual sector.

BRIEF DESCRIPTION OF THE DRAWINGS

Particular embodiments in accordance with the invention will now be described, by way of example only, and with reference to the accompanying drawings.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and appended claims to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Further, the meaning of the term "or" (as an inclusive or an exclusive "or") is determined by the surrounding context in which the term is used. Also, the terms "coupled to" and/or "couples with" and/or "applied to" (and the like) are intended to describe either an indirect or direct electrical connection. Thus, if a first device couples to a second device, that connection can be through a direct electrical connection, or through an indirect electrical connection via other devices and connections. The term "circuit switched" does not require actual switching of the circuit: it merely implies that a given communication link is connected, at least for a period of time, between two nodes for the purpose of transmitting a continuous stream of data. "Associated" means a controlling relationship, such as a memory resource that is controlled by an associated port. When used in context of flash memory, a logic "zero" is a logic state that may be written on a bit-by-bit basis, whereas a logic "one" is a logic state that is programmed into the flash memory on a block-by-block basis. While the invention has been described with reference to illustrative embodiments, this description is not intended to be construed in a limiting sense.

Figure 1:
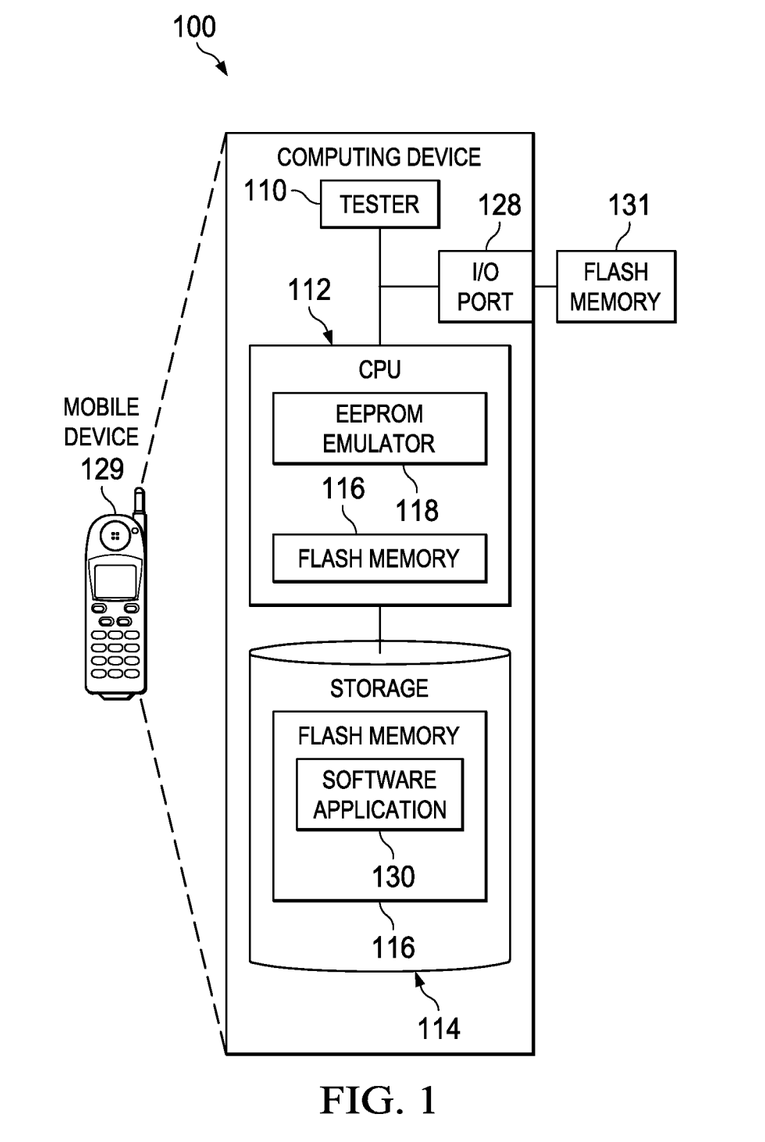
FIG. 1 shows an illustrative computing device 100 in accordance with embodiments of the disclosure.

FIG. 1 shows an illustrative computing device 100 in accordance with embodiments of the disclosure. The computing device 100 is, or is incorporated into, an electronic device 129, such as a cell-phone, a camera, a portable media player, a personal digital assistant (e.g., a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as RAM, flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). In this way, the software application 130 can be debugged in an environment which resembles post-production operation.

The CPU 112 typically comprises memory (including flash memory) and logic which store information frequently accessed from the storage 114. The CPU 112 is arranged to control and/or implement the functions of the flash memory 116 and the EEPROM emulator 118, which are used during the execution the software application 130. Portions of the EEPROM emulator 118 can be distributed amongst other components of the computing device 100 and/or the flash memory 131. The CPU 112 is coupled to I/O (Input-Output) port 128, which provides an interface (that is configured to receive input from (and/or provide output to) peripherals and/or computing devices, including tangible media (such as the flash memory 131) and/or cabled or wireless media (such as a Joint Test Action Group (JTAG) interface).

Bit-level programmable, block-level erasable non-volatile memory (including "flash" memory, both of which are referred to herein as "flash" memory) is formed in the substrate of an integrated circuit. The flash memory is electrically addressed and can be electrically erased and reprogrammed so that the state of memory is not lost when power is removed from the integrated circuit. Various kinds of flash memory are erased on a block-by-block basis and can be programmed (for example, written to) one bit at a time. A memory cell in the flash memory uses a charge stored in a floating gate of the memory cell to store a logical value. An erased bit of a memory cell is often stored (and read) as a logic "one," in which case a programmed bit of the memory cell is stored and read as logic "zero."

In contrast, an EEPROM is capable of being programmed and reprogrammed with either logic ones or logic zeros, without requiring an erase cycle on a block of memory. However, integration of the differing components and technologies used to implement different types of memories usually increases costs, component count, power consumption, and pin-out counts. As disclosed herein, an EEPROM emulator is arranged, for example, as an interface that allows a flash memory to be used in place of EEPROM having error correction controls (ECC).

Thus, the disclosed computing device 100 is arranged to provide increased integration by emulating the functionality of an EEPROM using error correction controls using flash memory. For example, EEPROM emulator 118 can be accessed to progressively write data to a virtualized address in flash memory while maintaining the ECC values that are associated with a previous value for the word of flash memory stored at the virtualized address. Maintaining the ECC value, for example, can avoid the transition of a stored data bit for the ECC value from a zero to a one (which in flash memory is normally accomplished using an erase cycle, which erases all the words stored in a block of memory). As disclosed herein, extra data bits are used to "pad" the data word of a record and/or pointer stored at the virtualized location in flash memory, and are selected such that the ECC data word stored at the virtualized location in flash memory does not change (or at least does not have a transition from a zero to a one for one of the data bits of the ECC value for the data word stored at the location in flash memory).

Figure 2:
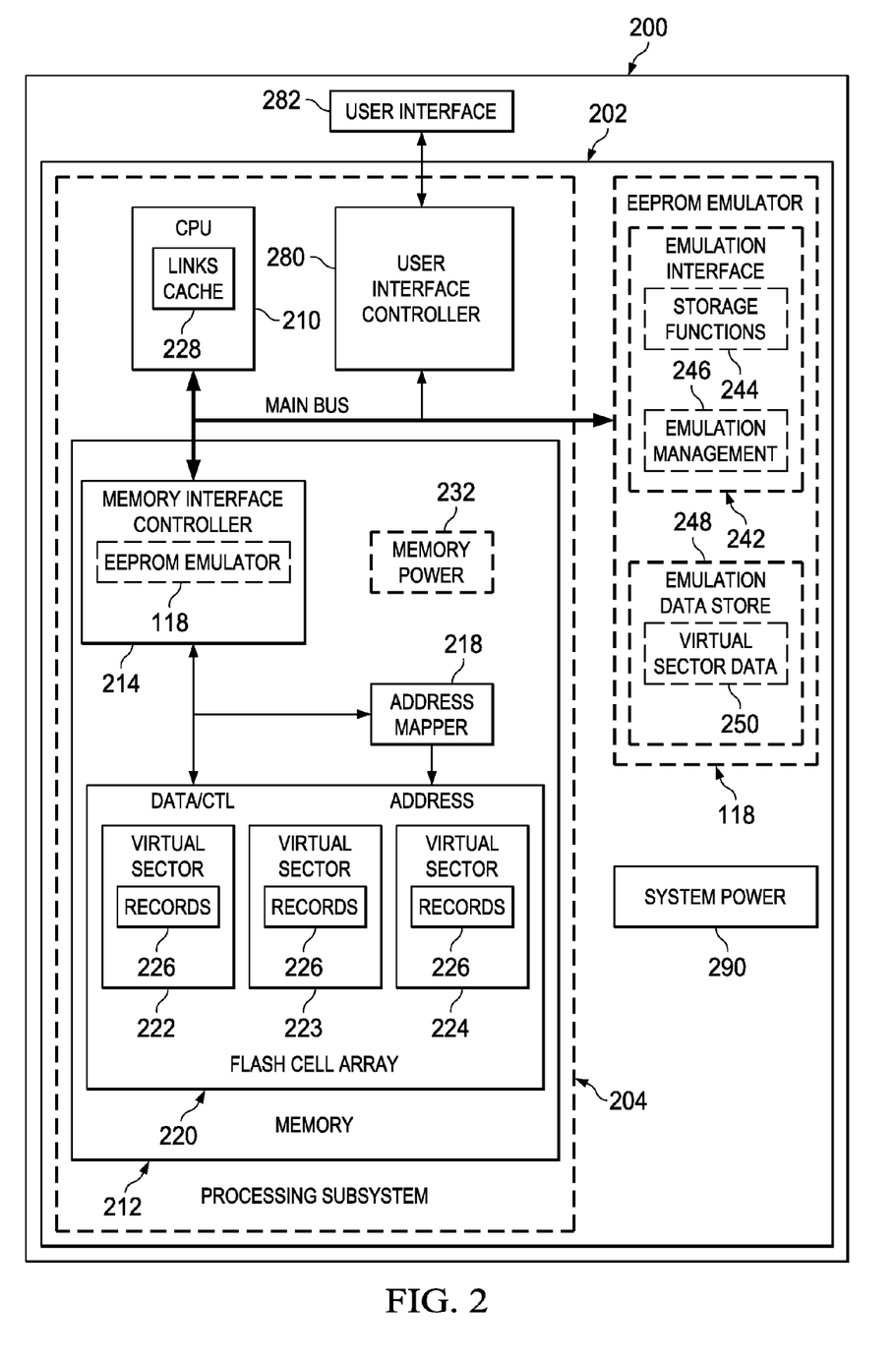
FIG. 2 is a schematic diagram illustrating a flash-based EEPROM emulation system having error correction controls in accordance with embodiments of the disclosure.

FIG. 2 is a schematic diagram illustrating a flash-based EEPROM emulation system having error correction controls in accordance with embodiments of the disclosure. Computing system 200 is illustrated as including a common substrate 202 upon which the illustrated elements of the computing system 200 are formed. (The common substrate 202 also includes chip-to-chip mounting technologies.) Forming and/or assembling the illustrated elements of the computing system 200 on the common substrate 202, for example, provides increased integration and reduces the number of connections for which drivers, bonding pads, and wiring would otherwise be used. In various embodiments, the elements illustrated as being formed in substrate 202 are optionally included in separate circuit boards and packages (such as the user interface 282).

The user interface controller 280 is arranged to prepare commanded information for display and to generate video control signals used to control the user interface 282 so that generated information can be displayed. Likewise, the user interface controller 280 is arranged to receive input information from a user via the user interface 282 so that the input information can be conveyed to the CPU 210. For example, a user can select a control to start up, shut down, reboot, (and the like), the system. In various embodiments, the EEPROM emulator 118 is initialized and controlled in response to a user selection made using the user interface 282. The user can, for example, select an operating parameter that determines when a new virtual sector is to be used. The selected operating parameter can be: no additional space available for received data, a time limit has been exceeded traversing a thread of the linked list, and a predetermined level of memory (such as 80%) in the active virtual disk has been programmed.

System power 290 is used to power both the elements of substrate 202 and the user interface 282 (such as a dashboard indicator or a display interface); although the user interface 282 can be partially or completely powered by another power supply. System power 290 and/or memory power 232 are controllable (including programmable) power supplies, for example, that are arranged to generate voltages for programming and erasing individual cells in memory 212.

The processing subsystem 204 (which is also a processing system in its own right) of substrate 202 typically includes a CPU 210, memory 212, and a user interface controller 280. CPU 210 is a DSP, controller, microprocessor, or the like, and is used to control at least the processing subsystem 204. Thus, the CPU 210 can be used to implement functions of the EEPROM emulator 118 and/or the EEPROM emulator may provide its own processor. CPU 210 is typically coupled to a memory interface 214 that is arranged to control accesses to memory 212.

The memory 212 is arranged to store information used by CPU 210 and information used for control and operational parameters for the EEPROM emulator 118 as discussed below. The memory 212 includes a memory interface controller 214, an address mapper 218, a flash (memory) cell array 220, and memory power 232. The memory interface controller 214 is arranged to permit memory accesses by CPU 210 or DMA (Direct Memory Accesses) of the memory 212 by subsystems such as the user interface controller 280 and EEPROM emulator 118 without requiring intervention by the CPU 210.

In one embodiment, the EEPROM emulator 118 is formed in the same substrate as the memory 212; whereas in other embodiments, the components (or portions thereof) of the EEPROM emulator 118 can be included within the memory 212 or distributed amongst other components of the computing system 200 (in the same or different substrate).

The address mapper 218 is arranged to receive addresses (via an address bus, for example) for addressing data to be read from or written to the flash cell array 220 and to translate the received addresses to physical addresses of the flash cell array 220. The address mapper 218 allows for different (or the same, if not remapped) physical cells of the flash cell array to be used for a received (logical) memory address by selecting replacement cells for cells that, for example, cannot be programmed correctly.

The flash cell array 220 includes, for example, virtual sectors 222, 223, and 224. In various embodiments, the flash cell array 220 includes, two, three, four, or more virtual sectors such as those illustrated by virtual sectors 222, 223, and 224. Each virtual sector includes one or more. The records 226 each include, for example, concatenated data packets (that are addressed as part of the record), which thus allow the records 226 to be of variable lengths (as discussed below with respect to FIG. 5).

In operation, an initialization routine identifies which of the virtual sectors is to be used (initially) and marks it as "Active" (e.g., virtual sector 222). Data to be stored is written to the first empty record 226 in the active virtual sector 222. For example, the flash cell array 220 receives data (via a data bus, for example) and timing information (via a control bus, for example) from the memory interface controller 214. The flash cell array 220 receives address information from the address mapper 218 and the information is written in the first available record location.

Whenever a record is to be updated, a linked list is used wherein the previously written-to record is updated to point to a new location that is used to store the newly updated record. Thus, it is not required to overwrite data in place (e.g., in situ). The linked list for a particular data record can be traversed to find the latest updated value for the record (such as after a system reboot) and/or the latest updated location for the record can be stored in links cache 228 (in memory relatively local to the CPU 210, which helps speed memory accesses).

If there is insufficient space (for example) in the active virtual sector 222 to update the data in the record, a second virtual sector (such as virtual sector 223) is selected and all the valid data (e.g., by traversing links to locate the last valid data) from the (other) records 226 in the active virtual sector 222 is copied to the virtual sector 223. After copying all the valid data of each record, the active virtual sector 222 is erased and the virtual sector 223 (for example) is marked as the active virtual sector. Further updates to records 226 are then written into the newly active virtual sector 223. The erased virtual sector can thus be used again when, for example, the last used virtual sector has insufficient space to store additional records. Example data structures for implementing the virtual sectors and records are now discussed.

Figure 3:
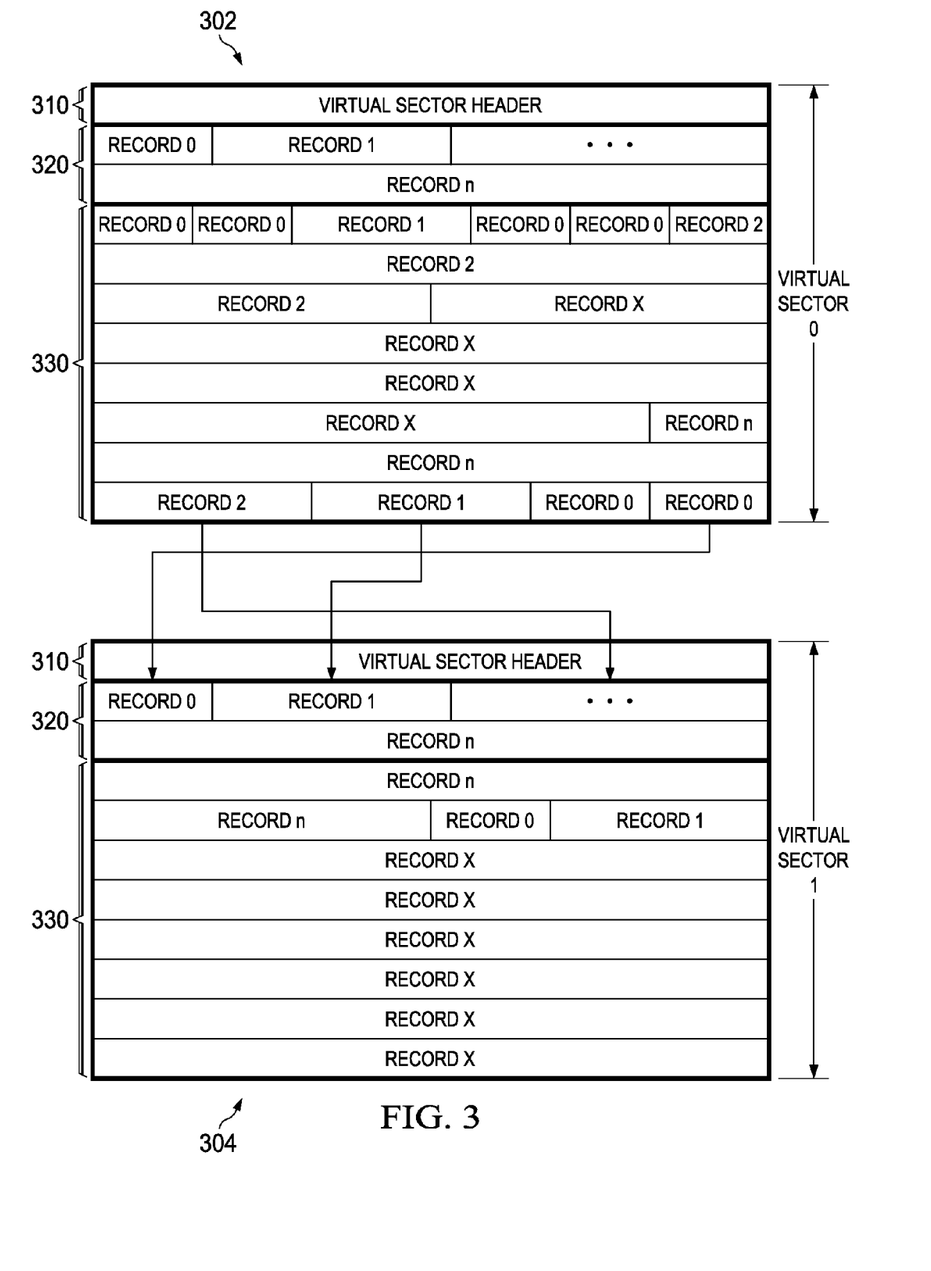
FIG. 3 is a block diagram illustrating virtual sector organization of a flash-based EEPROM emulation system having error correction controls in accordance with embodiments of the disclosure.

FIG. 3 is a block diagram illustrating virtual sector organization of a flash-based EEPROM emulation system having error correction controls in accordance with embodiments of the disclosure. The virtual sector organization that is used to partition a flash device is illustrated using virtual sector 0 (302) and virtual sector 1 (304). At least two virtual sectors are normally used to support a flash-based EEPROM emulation system. Each of the virtual sectors 302 and 304 includes a virtual sector header 310, a record index 320, and a data block structure 330.

Figure 4:
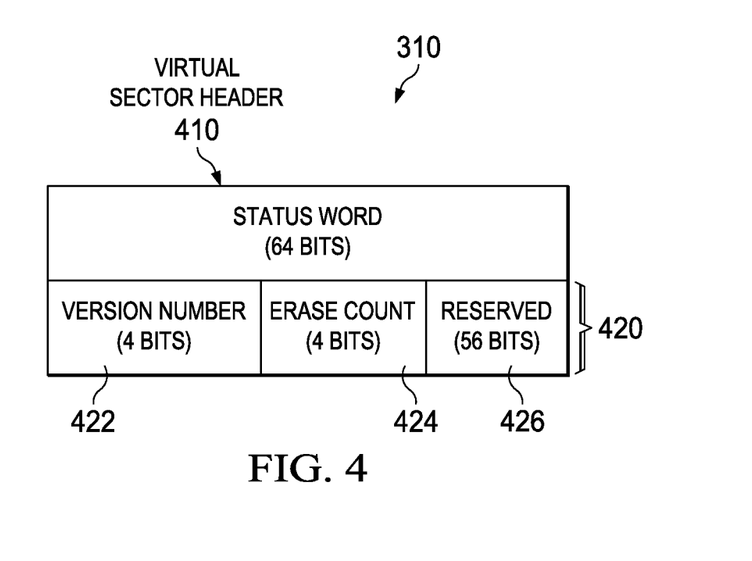
FIG. 4 is a block diagram illustrating a virtual sector header of a flash-based EEPROM emulation system having error correction controls in accordance with embodiments of the disclosure.

FIG. 4 is a block diagram illustrating a virtual sector header of a flash-based EEPROM emulation system having error correction controls in accordance with embodiments of the disclosure. The virtual sector header 310 in an embodiment includes two 64-bit words (where the length of each word is 16 bytes) located at a predefined location of the virtual sector (such as at the first address of the virtual sector structure). The state of the virtual sector structure is maintained in the virtual sector header using status indicator 410. Status indicator 410 is the first 64-bit word of the virtual sector header and is used to indicate the current state of the virtual sector. Table 1 indicates the various states of a virtual sector (represented using hexadecimal notation):

TABLE 1

Virtual Sector Header States

| State | Value |
|---|---|
| Invalid Virtual Sector | 0xFFFFFFFFFFFFFFFF |
| Empty Virtual Sector | 0x0000FFFFFFFFFFFF |
| Copy Virtual Sector | 0x00000000FFFFFFFF |
| Active Virtual Sector | 0x000000000000FFFF |
| Ready for Erase | 0x0000000000000000 |

An Invalid Virtual Sector status indicates a virtual sector that is either in process of being erased or has not yet been initialized. An Empty Virtual Sector status indicates the virtual sector has been erased and initialized and can be used to store data. A Copy Virtual Sector status indicates that terminal link values and other maintenance information is being moved from a full virtual sector to the instant virtual sector to accomplish moving last valid records of the (for example, full) active virtual sector. An Active Virtual Sector status indicates the instant virtual sector is designated as the active sector. A Ready for Erase status indicates terminal link values and other maintenance information of the instant virtual sectors have been correctly replicated to a new virtual sector and the instant virtual sector is now ready to be erased and initialized for re-use.

The codes for conveying the status of a virtual sector are arranged in accordance with a sequence of states through which the virtual sector is cycled during the use and re-use of the virtual sector. Thus, a progression of states of a virtual sector is arranged to be maintained in flash memory without requiring an erase cycle (to change a bit status from a logic zero to a logic one, for example) or requiring a change of the associated ECC (electronic correction control) bits. The progression of states is ordered such that each progressive state of the sector is reflected by an increase in the number of bits having logic zeroes in the status word for the virtual sector.

Virtual sector information record 420 is the second 64-bit word in the virtual sector header. The virtual sector information record 420 is used to record information used to manage the virtual sector organization. The version number field 422 is used to indicate the current version of the virtual sector. The erase count 424 is used to indicate the number of times the instant virtual sector has been erased. The erase count 424 is incremented each time the virtual sector is erased. The reserved field 426 is used for storing information (such as a pointer to a record in the virtual sector that includes error information about specific bits in the virtual sector that are associated with memory errors) to be preserved after an erase cycle has occurred on the instant virtual sector. If desired, the reserved field 426 is also used for storing bits used for bit padding (as discussed below) to maintain electronic correction control (ECC) values.

With reference again to FIG. 3, the record index 320 provides a predefined location for an address of a particular record to be stored. The size of the record index is selected using the size of the virtual sector used for storing records, the minimum size of a record, and the number of records. For example, if the minimum size of a record is 64 bits, the lowest six bits from the address can be truncated, and the resulting tag address is stored in the record index 320. Thus, each index in the record index is used to address a particular record: when the pointed-to address of the particular record includes (yet another) link to for a more-current value of the particular record (as described above), the index forms the head of a linked list that is used to determine an ultimate (e.g., latest) value for the particular record. When the current active sector is full (or nearly so), the terminal value in the linked list for each index is used as the entry for each index in the record index 320 of the new active sector. Thus, the record index 320 forms the "head" of a linked list having multiple threads, where each thread is associated with a particular record. Each record is identified by an associated address, for example.

The data block structure 330 (illustrated in FIG. 5, as discussed below) is used to define a mapping for where each data block of each records within a virtual sector. One or more variables can be stored within a data block based on a user definition. In the illustrated embodiment, the smallest amount of data that can be stored within the data block is 64 bits. If the size of the record to be stored exceeds 64 bits, additional data packet(s) are added in 64 bit increments to store the bits in excess of 64 bits. The data block structure 330 is limited to the size of the virtual sector in which it resides. When a write to the current virtual sector requires allocation of an additional data packet and the current virtual sector is full (e.g., does not have space available to store a data packet), active records of the data block structure 330 are duplicated in the next virtual sector to be made active. The last recorded records in virtual sector 0 (302) each contain a pointer to the corresponding record in the data record index 320 in virtual sector 1 (304).

Figure 5:
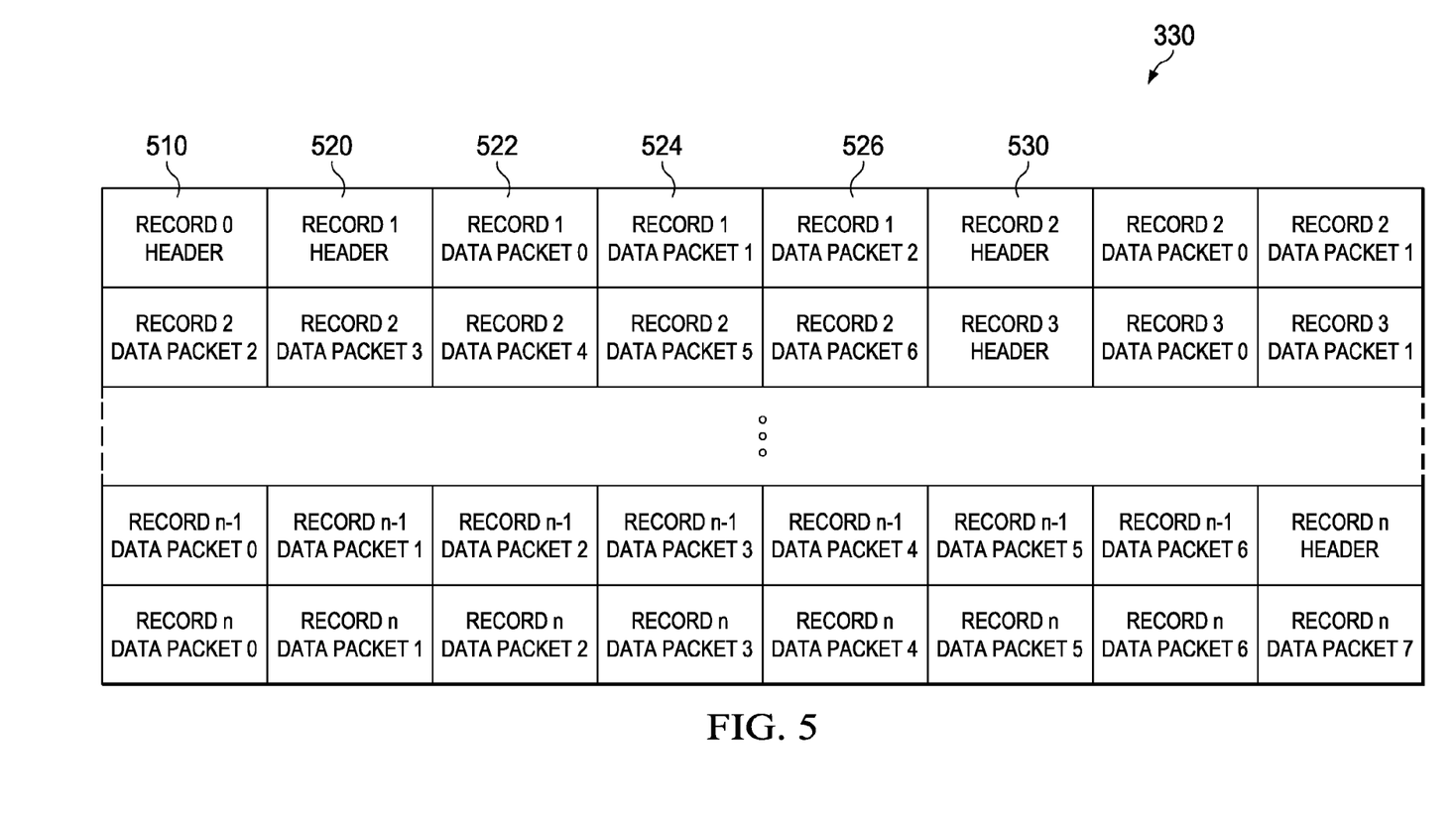
FIG. 5 is a block diagram illustrating a data block structure of a flash-based EEPROM emulation system having error correction controls in accordance with embodiments of the disclosure.

FIG. 5 is a block diagram illustrating a data block structure of a flash-based EEPROM emulation system having error correction controls in accordance with embodiments of the disclosure. Data block structure 330 includes data blocks for storing records. For example, data block 510 is used as a header for record 0, data block 520 is used as a header for record 1, and data block 530 is used as a header for record 2. The header for record 1 (in data block 520) includes an indication of the record size (such as the number of associated data packets) and/or address information for accessing the associated data packets (in data blocks 522, 524, and 526). Other data blocks are included for purposes of illustration.

Figure 6:
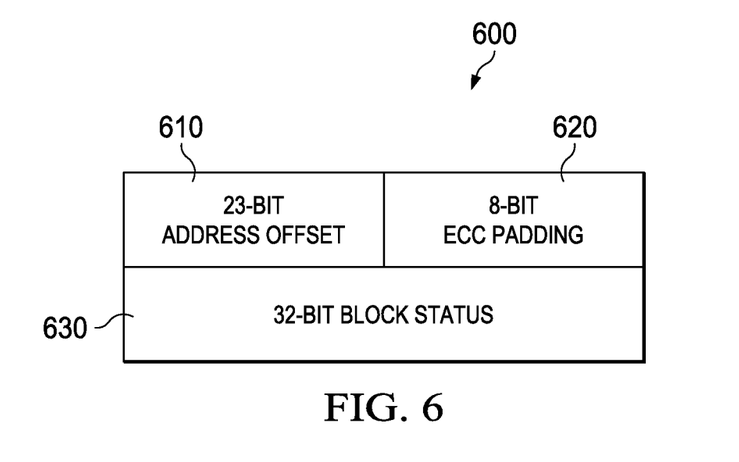
FIG. 6 is a block diagram illustrating a data block header of a flash-based EEPROM emulation system having error correction controls in accordance with embodiments of the disclosure.

FIG. 6 is a block diagram illustrating a data block header 600 of a flash-based EEPROM emulation system having error correction controls in accordance with embodiments of the disclosure. Field 610 contains a 23-bit address offset that indicates (e.g., points to) the address of the next received data block entry that replaces the current data block entry of the record associated with data block header 600. The address offset of field 610 is updated after the status field of the (new) data block header 600 that replaces the current data block entry of the record associated with data block header 600 is marked as "Valid." Field 620 is used to provide 8-bit ECC padding, which is used to allow writing of the 23-bit address offset without creating an ECC error using ECC progressive programming techniques. Field 630 is used to provide a progressively programmable status word of the record associated with data block header 600. The 32-bit block status word of field 630 is progressively programmed using bit changes in "one direction" only (e.g., from logic ones to logic zeroes), which allows individual bits to be programmed and multiple bits to be changed so that an ECC error does not occur.

The block status word of field 630 is used to ensure that data integrity is maintained even if the block (data) update process for a record is interrupted by an uncontrolled event such as a power supply failure or reset. Table 2 indicates the various states of a virtual sector (represented using hexadecimal notation):

TABLE 2

| Data Block States | |
|---|---|
| State | Value |
| Empty Block | 0xFFFFFFFF |
| Start Program Block | 0xFFFFFF00 |
| Valid Block | 0xFFFF0000 |
| Invalid Block | 0xFF000000 |
| Corrupt Block | 0x00000000 |

A status of Empty Block indicates that new data can be written to this block. A status of Start Program Block indicates that the data block is in the process of being programmed with data. A status of Valid Block indicates that the data block is fully programmed and contains valid data. A status of Invalid Block indicates that the data block contains invalid or old data. A status of Corrupt Block indicates that the data block is corrupted and the emulator should not use the block for storing records or pointers for records.

The codes for conveying the status of a record data block are arranged in accordance with a sequence of states through which the record data block is updated as new data for the record is being written. Thus, a progression of states of a data block is arranged to be maintained in flash memory without requiring an erase cycle (to change a bit status from a logic zero to a logic one, for example) or requiring a change of the associated ECC bits. The progression of states is ordered such that each progressively programmed state of the sector is reflected by an increase in the number of bits having logic zeroes in the status word for the data block.

With reference again to FIG. 2, the EEPROM emulator 118 includes emulation interface 242 and a maintenance data store 248. Emulation interface 242 is arranged to perform storage and management tasks with respect to electrically addressed non-volatile memory (flash) memory. More specifically, storage functions 244 provides an interface for reading to and writing from flash memory in emulation mode, while emulation management 246 provides management routines for setting up and maintaining various data structures arranged to permit flash memory emulation (of EEPROM memory, for example.) Emulation interface 242 includes programmable logic and/or shares execution of the emulation tasks with CPU 210.

The emulation interface 242 includes storage functions 244, which are arranged (for example) to read to and write from a flash memory as if the flash technology was a virtual substitute for EEPROM technology.

A FEE Write Asynchronous routine initiates an asynchronous write operation which is finished by the FEE Task function (discussed below). The routine checks for any errors in the input parameters and, if so, returns with flash job result set to "JOB_FAILED." Some of the errors that are detected include: a write start address being aligned to a flash page boundary and that lies within the specified lower and upper flash address boundaries, a write length that is not greater than zero, a FEE emulation interface that has not been initialized, a FEE emulation interface that is currently busy, and a given data buffer pointer that is a null pointer. The Write Asynchronous function accepts one job (such as a write, erase, or read) at a time. If any other job is in progress, the function returns a result stating that FEE emulation interface is "Busy" and cannot currently accept a new job. The Write Asynchronous function determines the block start address and calculates the corresponding memory write address. The block offset is typically fixed to zero. The Write Asynchronous function determines if the length of the data to be written exceeds the available space on the Active virtual sector. If so, a virtual sector swap operation is initiated and the data is written to the new virtual sector. This function sets the block status to "Start Program Block" to indicate that it has started programming data to this block. The function programs the complete data to the block and sets the block status to "Valid" after finishing programming of the data. The function also sets the FEE emulation interface state to "IDLE" and the flash job result to "JOB_OK" after having finished programming the data.

A FEE Write Synchronous routine provides the functionality to program data to a block synchronously. The routine checks for any errors in the input parameters and, if so, returns with flash job result set to "JOB_FAILED." Some of the errors that are detected include: a write start address being aligned to a flash page boundary and that lies within the specified lower and upper flash address boundaries, a write length that is not greater than zero, a FEE emulation interface that has not been initialized, a FEE emulation interface that is currently busy, and a given data buffer pointer that is a null pointer. The Write Synchronous function accepts one job (write/erase/read) at a time. If any other job is in progress, the function returns a result stating that FEE emulation interface is "Busy" and cannot accept this job currently. The function determines the block start address and calculates the corresponding memory write address. The block offset is typically fixed to zero. The Write Synchronous function determines if the length of the data to be written exceeds the available space on the active virtual sector. If so, a virtual sector swap operation is initiated and the data is written to the new virtual sector. This function sets the block status to "Start Program Block" to indicate that it has started programming data to this block. The function programs the complete data to the block and sets the block status to "Valid" after finishing programming of the data. The function also sets the FEE emulation interface state to "IDLE" and the flash job result to "JOB_OK" after having finished programming the data.

A FEE Read Synchronous routine provides the functionality for synchronous reading of data from a block. The routine checks for any errors in the input parameters and, if so, returns with flash job result set to "JOB_FAILED." Some of the errors that are detected include: a read start address being aligned to a flash page boundary and that lies within the specified lower and upper flash address boundaries, a read length that is not greater than zero, a FEE emulation interface that has not been initialized, a FEE emulation interface that is currently busy, and a given data buffer pointer that is a null pointer. The Read Synchronous function accepts one job (write/erase/read) at a time. If any other job is in progress, the function returns a result stating that FEE emulation interface is "Busy" and cannot currently accept a new job. The function determines the block start and block offset addresses and calculates the corresponding memory read address. The function determines if the block status is set to "Valid" state before reading the data. If not, the function returns with the flash job result set to "JOB_FAILED." The function copies a continuous flash memory block starting from the computed start address of size length to a read buffer pointed to by a "DataBufferPtr" variable. The function also sets the FEE emulation interface state to "IDLE" and the flash job result to "JOB_OK" after having finished reading the data.

The emulation interface 242 also includes emulation management functions 246, which are arranged (for example) to initialize, manage, and erase flash memory as if the flash technology memory was a virtual substitute for EEPROM technology memory.

A flash EEPROM emulation (FEE) Start function provides functionality for initializing the FEE emulation interface. This routine is normally called before any other data operation is called. The routine is determines if any of virtual sectors are in an active state. If an active virtual sector is not found, then an erased virtual sector is marked as "Active." If an active virtual sector is found, then the found virtual sector is designated as "Active" and any blocks containing invalid data are marked as "Corrupted." If any error occurs during initialization (such as having two or more active virtual sectors, or having one active virtual sector and one copy virtual sector), all the virtual sectors are erased and one virtual sector is marked as "Active." The Fee Start function also handles Reset events. Reset is one of the events possible during field reprogramming and can be caused spurious reset signals, external hardware resets, and resets due to a power-shut down. Resets can occur at any time and may corrupt data during the update of a data block or a virtual sector swap operation that occurs during a Reset event. Data corruption is minimized by restarting the emulation by using the FEE Start function, which also initializes the EEPROM emulator 118 and relevant registers. The FEE Start function sets the FEE emulation interface state to "IDLE" and the flash job result to "JOB_OK" after having finished the FEE emulation interface initialization.

A FEE GetJobResult routine returns the result of the last job synchronously. The routine determines the result of the last job executed. The Erase, Write, Read operations share the same job result, allowing the result of the last job to be queried.

A FEE GetVersion routine returns the version information for the FEE emulation interface 242. The version information typically includes major version number, minor version number, and revision number of a software build of the FEE emulation interface.

A FEE Manager routine manages the internal operations of FEE and is typically invoked whenever there is no other job pending. The function handles background tasks used to manage the FEE emulation interface. The function determines whether a virtual sector swap operation is in progress. If so, the valid data blocks are identified in the old virtual sector and copied to the new virtual sector. Further, the function identifies any virtual sector needs to be erased and, if so, erases the identified virtual sectors. The function is called when the FEE emulation interface is in "IDLE" state. When the FEE Manager routine is called, the routine sets the FEE emulation interface to a "Busy Internal" state.

A FEE Task routine handles read/write/erase jobs that have been submitted asynchronously. The routine completes (asynchronous) jobs initiated by FEE WriteAsynch or FEE EraseBlock functions. When a job has been initiated, the FEE emulation interface's environment (such as CPU 210) can call the function cyclically to determine when the job finishes. After a read, erase or write job has been finished; the function sets the FEE emulation interface's job result to "JOB_OK" (if currently in a JOB_PENDING state) and sets FEE emulation interface's state to "IDLE."

A FEE EraseBlock routine provides functionality for erasing a data block asynchronously. The routine checks for any errors in the input parameters and on detection of any error should return with Flash Job result set to "JOB_FAILED." The routine accepts one job (such as a write/erase/read request) at a time. If any other job is in progress, the routine returns a status indication that FEE emulation interface is "Busy" and cannot accept this job currently. The function determines the block start address and calculates the corresponding memory write address. The function also determines if the length of the data block to be erased exceeds the available space on the active virtual sector. If so, the routine initiates a virtual sector swap operation and erases the data block in the new virtual sector. The function sets the block status to "Start Program Block" to indicate the process of erasing data of this block had been started. The function FEE Task is called cyclically to complete the EraseBlock operation, where the FEE Task function sets the block status to "Valid" after finishing erasing the data and (if necessary) updates the previous data block header to point to the newly erased block. The EraseBlock function sets the FEE emulation interface state to "Busy" and the flash job result to JOB_PENDING and return after initiating the erase operation.

A FEE InvalidateBlock routine provides functionality for invalidating a Data Block asynchronously. The routine checks for any errors in the input parameters and on detection of any error returns with flash job result set to "JOB_FAILED." The routine accepts one job (such as a write/erase/read request) at a time. If any other job is in progress, the routine returns a status indication that FEE emulation interface is "Busy" and cannot accept this job currently. The routine determines the block start address and calculates the corresponding memory write address. The function also determines if the length of the data block to be erased exceeds the available space on the active virtual sector. If so, the routine initiates a virtual sector swap operation and marks the data block in the new virtual sector as "Invalid." The routine sets the block status to "Invalid" to indicate that the block contains invalid data. The routine sets the FEE emulation interface state to "IDLE" and the flash job result to "JOB_OK" and returns after initiating the virtual sector swap operation.

A FEE Format routine provides functionality for erasing all the virtual sectors synchronously. The routine determines the starting and ending address of the virtual sector and the bank of the flash cell array 220 in which the virtual sectors reside. The routine issues an Erase command to erase the virtual sector, waits until completion of the Erase operation, and sets the FEE emulation interface state to "IDLE" and the state of the Flash Module State to "UNINT" and returns upon completion.

A FEE Shutdown routine provides functionality for performing a bulk data write when shutting down the system synchronously. Data records (such as virtual sector data 250) which do not have to be stored after each update may be kept in the data buffer (such as virtual sector data 250 of emulation data store 248) until system shut down. Such data records that would otherwise be stored in EEPROM can be stored in flash cell array 220 prior to the application shutdown. The FEE Shutdown routine checks for any errors in the input parameters and on detection of any error returns a status indication with flash job result set to "JOB_FAILED." Some of the errors detected include: a write start address that is aligned to a flash page boundary and that lies within the specified lower and upper flash address boundaries, a write length that is not greater than zero, that the FEE module has not been initialized, that the FEE module is currently busy, and that the given data buffer pointer is a null pointer. The routine determines the block start address and calculates the corresponding memory write address. The block offset is set to zero. The function sets the block status to "Start Program Block" to indicate that the process of programming data to this block has started. The function programs the complete set of most recent data to the block and sets the block status to "Valid" after finishing programming of the data. The function sets the FEE module state to "IDLE" and the flash job result to "JOB_OK" after having finished programming the data.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A circuit for emulating bit-level erasable non-volatile memory, comprising:
an emulator that is arranged to activate a first virtual sector of a bit-level programmable, block-level erasable non-volatile memory, the first virtual sector arranged to store received write requests having an address and a record to be written to the received address, the emulator arranged to store in the first virtual sector in a linked list of records each subsequent record received in subsequent write requests having the received address, wherein a separate thread in the linked list is maintained for each different received address, the emulator arranged to copy the last record subsequently received for each of the received addresses to a linked list of a second virtual sector when a first operating parameter has been exceeded, and the emulator arranged to deactivate and erase the active virtual sector when the last records subsequently received for each of the received addresses in the linked list active virtual sector have been copied to the second virtual sector.

2. The circuit of claim 1, wherein the header of the linked list is stored in a predetermined location of each virtual sector.

3. The circuit of claim 1, wherein the a bit-level programmable, block-level erasable non-volatile memory is arranged to be programmed by writing bits on a bit-by-bit basis and is arranged to be erased on a block-by-block basis.

4. The circuit of claim 1, wherein the first operating parameter is one of: no additional space available for received data, a time limit has been exceeded traversing a thread of the linked list, and a predetermined level of memory in the active virtual disk had been programmed.

5. The circuit of claim 4, wherein the last entry of each thread in the linked list is updated by programming bits in the last entry when a subsequent record is appended to a thread of the linked list.

6. The circuit of claim 1, wherein the emulator is arranged in the same substrate as the bit-level programmable, block-level erasable non-volatile memory.

7. The circuit of claim 1, wherein the emulator is arranged to store a record that has been subsequently received in a subsequent write request by using a thread of a linked list of the second virtual sector when a second operating parameter of the active virtual sector has been exceeded.

8. The circuit of claim 7, wherein the second operating parameter is one of: no additional space available for received data, a time limit has been exceeded traversing a thread of the linked list, and a predetermined level of memory in the active virtual disk had been programmed.

9. The circuit of claim 1, wherein the emulator is arranged to reactivate the first active sector after the first active sector has been erased.

10. The circuit of claim 1, wherein each virtual sector includes a header that is progressively programmed without erasure to indicate whether the state of the associated virtual sector is one of empty, active, being copied, and ready-to-erase.

11. A processing system, comprising:
a processor that is arranged to generate write requests having an address and a record to be written to the received address;
an emulator that is arranged to activate a first virtual sector, the first virtual sector arranged to store received write requests having an address and a record to be written to the received address, the emulator arranged to store in the first virtual sector in a linked list of records each subsequent record received in subsequent write requests having the received address, wherein a separate thread in the linked list is maintained for each different received address, the emulator arranged to copy the last record subsequently received for each of the received addresses to a linked list of a second virtual sector when a first operating parameter has been exceeded, and the emulator arranged to deactivate and erase the active virtual sector when the last records subsequently received for each of the received addresses in the linked list active virtual sector have been copied to the second virtual sector; and
a bit-level programmable, block-level erasable non-volatile memory that contains hardware error correction controls (ECC) and is arranged to be programmed by writing bits on a bit-by-bit basis and is arranged to be erased on a block-by-block basis.

12. The system of claim 11, wherein the bit-level programmable, block-level erasable non-volatile memory is flash memory.

13. The system of claim 12, wherein the last record subsequently received for the received address is progressively written to a virtualized address associated with the received address in the flash memory while maintaining ECC values that are associated with a previous value for the word of flash memory stored at the virtualized address.

14. The system of claim 13, wherein the ECC values are maintained by padding bits to a virtual address store in a data word controlled by the ECC.

15. The system of claim 11, wherein the first operating parameter is selected by a user and is one of: no additional space available for received data, a time limit has been exceeded traversing a thread of the linked list, and a predetermined level of memory in the active virtual disk had been programmed.

16. The system of claim 11, wherein each virtual sector includes a header that is progressively programmed without erasure to indicate whether the state of the associated virtual sector is one of empty, active, being copied, and ready-to-erase.

17. A method for emulating bit-level erasable non-volatile memory, comprising:
activating a first virtual sector of a bit-level programmable, block-level erasable non-volatile memory, the first virtual sector arranged to store received write requests having an address and a record to be written to the received address;
storing in the first virtual sector in a linked list of records each subsequent record received in subsequent write requests having the received address, wherein a separate thread in the linked list is maintained for each different received address;
copying the last record subsequently received for each of the received addresses to a linked list of a second virtual sector when a first operating parameter has been exceeded; and
deactivating and erasing the active virtual sector when the last records subsequently received for each of the received addresses in the linked list active virtual sector have been copied to the second virtual sector.

18. The method of claim 17, comprising reactivating the first active sector after the first active sector has been erased.

19. The method of claim 17, wherein the first operating parameter is one of: no additional space available for received data, a time limit has been exceeded traversing a thread of the linked list, and a predetermined level of memory in the active virtual disk had been programmed.

20. The method of claim 17, comprising progressively programming a header within each virtual sector without erasure to indicate whether the state of the associated virtual sector is one of empty, active, being copied, and ready-to-erase.

* * * * *